No. 855,408. PATENTED MAY 28, 1907.
G. W. MIMS.
NUT LOCK.
APPLICATION FILED JAN. 12, 1907.
FIG_1_
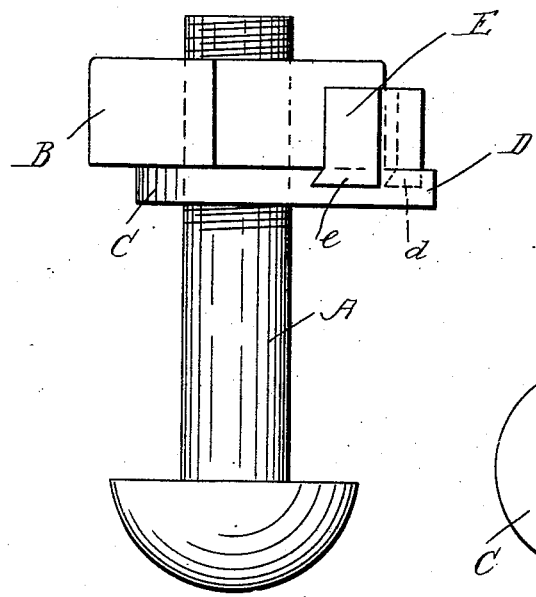
FIG_3_
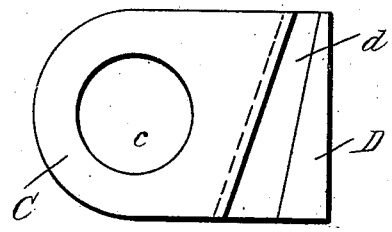
FIG_2_
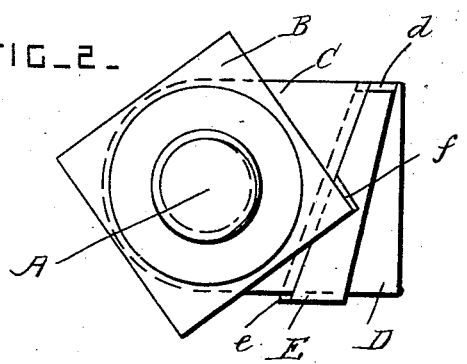
FIG_4_
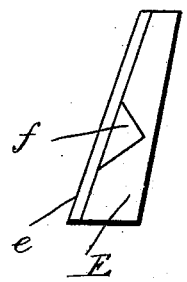
WITNESSES:
Jacob Schaefer
Harry Wagner
INVENTOR
George W. Mims.
BY Herbert W. T. Jenner.
Attorney

UNITED STATES PATENT OFFICE.

GEORGE W. MIMS, OF PADUCAH, KENTUCKY, ASSIGNOR OF ONE-THIRD TO CECIL REED AND ONE-THIRD TO CARROL J. SMITH, OF PADUCAH, KENTUCKY.

NUT-LOCK.

No. 855,408.  Specification of Letters Patent.  Patented May 28, 1907.

Application filed January 12, 1907. Serial No. 351,973.

*To all whom it may concern:*

Be it known that I, GEORGE W. MIMS, a citizen of the United States, residing at Paducah, in the county of McCracken and State of Kentucky, have invented certain new and useful Improvements in Nut-Locks; and I do hereby declare the following to be a full, clear, and exact description of the invention, such as will enable others skilled in the art to which it appertains to make and use the same.

This invention relates to locks for nuts on bolts; and it consists in the novel construction and combination of the parts hereinafter fully described and claimed.

In the drawings, Figure 1 is a side view of a bolt provided with a nut and locking mechanism according to this invention. Fig. 2 is a plan view of the same. Fig. 3 is a detail plan view of the locking washer. Fig. 4 is a plan view of the locking wedge.

A is a bolt, and B is its nut, said parts being of any approved form and construction.

C is a washer plate provided with a hole $c$ which is slipped over the bolt so that the plate comes under the nut. The washer plate has an extension D upon one side and $d$ is a dovetailed and wedge-shaped groove formed in the said extension below the flat upper face of the plate upon which the bottom of the nut bears. This groove is arranged diagonally of the said extension and at a tangent to the circle formed by revolving the nut.

E is the locking wedge which is provided with a dovetailed portion $e$ at its bottom edge.

F is an angular notch in the face of the locking wedge which comes next to the hole $c$ when the said wedge is slid into engagement with the groove $d$.

The washer-plate is placed on the bolt and the nut is screwed hard up. The point of the locking-wedge is then inserted in the groove with its notch engaging with one corner of the nut, and the wedge is then slid into its groove and the nut is revolved backward simultaneously until the parts are in the positions shown in Fig. 2. When in this position the wedge fits tightly in the groove and the nut cannot move in either direction. The washer-plate cannot revolve on the bolt on account of its large under surface, and when used to hold down a rail-road rail the web of the rail prevents the washer-plate from revolving.

What I claim is:

In a nut lock, the combination, with a bolt, and its nut; of a washer-plate provided with a hole for the said bolt and having also an extension upon one side provided with a wedge-shaped and dovetailed groove which is overlapped by the corners of the said nut, and a locking-plate provided at its bottom edge with a wedge-shaped and dovetailed portion which is slidable in the said groove and having also a V-shaped notch in the middle part of one of its side faces for engaging with a corner of the said nut.

In testimony whereof I have affixed my signature in the presence of two witnesses,

GEORGE W. MIMS.

Witnesses:
CARROLL J. SMITH,
CECIL REED.